US010785109B1

(12) United States Patent
Sidebottom et al.

(10) Patent No.: US 10,785,109 B1
(45) Date of Patent: Sep. 22, 2020

(54) AUTOMATED GENERATION OF A NETWORK SERVICE DESIGN

(71) Applicant: Juniper Networks, Inc., Sunnyvale, CA (US)

(72) Inventors: Greg Sidebottom, Ottawa (CA); Sankar Ramamoorthi, San Jose, CA (US); Zhifei Fang, Ottawa (CA); Yue Gao, Kanata (CA); Stephen Kenneth Flamm, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 636 days.

(21) Appl. No.: 15/157,024

(22) Filed: May 17, 2016

(51) Int. Cl.
*H04L 12/24* (2006.01)
*H04L 29/08* (2006.01)

(52) U.S. Cl.
CPC .......... *H04L 41/0826* (2013.01); *H04L 67/10* (2013.01)

(58) Field of Classification Search
CPC .................. H04L 41/0823; H04L 41/0826
See application file for complete search history.

(56) References Cited

U.S. PATENT DOCUMENTS

| | | | | |
|---|---|---|---|---|
| 9,154,589 B1* | 10/2015 | Klein | ................... | H04L 69/329 |
| 2009/0300607 A1* | 12/2009 | Ferris | ................. | G06F 9/45558 |
| | | | | 718/1 |
| 2010/0199267 A1* | 8/2010 | Rolia | ..................... | G06Q 10/06 |
| | | | | 717/135 |
| 2012/0124211 A1* | 5/2012 | Kampas | ..................... | G06F 9/50 |
| | | | | 709/226 |
| 2014/0019966 A1* | 1/2014 | Neuse | ................. | G06F 9/45533 |
| | | | | 718/1 |
| 2014/0214496 A1* | 7/2014 | Macbeath | .......... | G06Q 30/0283 |
| | | | | 705/7.37 |
| 2014/0317166 A1* | 10/2014 | Iyoob | ................. | G06Q 30/0631 |
| | | | | 709/201 |
| 2016/0105489 A1* | 4/2016 | Llorca | .................... | H04W 4/70 |
| | | | | 709/226 |

* cited by examiner

*Primary Examiner* — Tonia L Dollinger
*Assistant Examiner* — Jonathan A Sparks
(74) *Attorney, Agent, or Firm* — Harrity & Harrity, LLP

(57) ABSTRACT

A device may receive a set of design parameters for a network service. The set of design parameters may include information that identifies one or more network functions associated with the network service. The device may determine attribute information associated with a plurality of virtual network functions (VNFs). A VNF, of the plurality of VNFs, may be configurable to perform at least one network function of the one or more network functions. The device may generate a network service design, associated with providing the network service, based on the set of design parameters and the attribute information. The network service design may include information identifying one or more VNFs, of the plurality of VNFs, that are capable of providing the network service in accordance with the set of design parameters. The device may provide information associated with the network service design.

20 Claims, 11 Drawing Sheets

AUTOMATED GENERATION OF A NETWORK SERVICE DESIGN

BACKGROUND

A virtual network function (VNF) is a software implementation of a network function. For example, the VNF may be configured to carry out the network function using a virtual machine controlled by a hypervisor. The VNF may perform a network function, such as a firewall function, a domain name service (DNS), a caching function, a network address translation (NAT), a uniform resource locator (URL) filtering function, or the like.

SUMMARY

According to some possible implementations, a device may include one or more processors to: receive a set of design parameters for a network service, where the set of design parameters may include information that identifies one or more network functions associated with the network service; determine attribute information associated with a plurality of virtual network functions (VNFs), where a VNF, of the plurality of VNFs, may be configurable to perform at least one network function of the one or more network functions; generate a network service design, associated with providing the network service, based on the set of design parameters and the attribute information, where the network service design may include information identifying one or more VNFs, of the plurality of VNFs, that are capable of providing the network service in accordance with the set of design parameters; and provide information associated with the network service design.

According to some possible implementations, a non-transitory computer-readable medium may store that, when executed by one or more processors, cause the one or more processors to: receive a set of design parameters, associated with a network service, that identifies a set of network functions associated with the network service; receive attribute information associated with a plurality of virtual network functions (VNFs), where a VNF, of the plurality of VNFs, may be configurable to perform at least one network function of the set of network functions; generate a network service design, associated with providing the network service, based on the set of design parameters and the attribute information, where the network service design may identify one or more VNFs, of the plurality of VNFs, capable of being configured to provide the network service in accordance with the set of design parameters; and provide information associated with the network service design.

According to some possible implementations, a method may include: receiving, by a device, a set of design parameters, associated with a network service, that identifies a set of network functions associated with the network service; determining, by the device, attribute information associated with a plurality of virtual network functions (VNFs), where a VNF, of the plurality of VNFs, may be configurable to perform at least one network function of the set of network functions; generating, by the device, a network service design, associated with providing the network service, based on the set of design parameters and the attribute information, where the network service design may identify one or more VNFs, of the plurality of VNFs, capable of being configured to provide the network service in accordance with the set of design parameters; and providing, by the device, information associated with the network service design.

DETAILED DESCRIPTION

The following detailed description of example implementations refers to the accompanying drawings. The same reference numbers in different drawings may identify the same or similar elements.

With the move toward network function virtualization, there is an increasing variety of ways in which service providers may implement network services required by customers. VNF vendors provide various VNFs that may be configured to implement such network services, and each VNF may have particular costs and/or capabilities. These VNFs can be "stitched" together in a multitude of ways in order to provide the required network services. Given all of the network service design possibilities for providing the network services using the VNFs, it may be difficult to design a network service that uses one or more VNFs in order to meet a customer need (e.g., in terms of cost, performance, value, efficiency).

Implementations described herein provide a design platform capable of receiving information associated with requirements for a network service and generating a network service design based on analyzing the requirements and information associated with a set of VNFs configured to perform one or more network functions associated with the network service.

Figure 1:
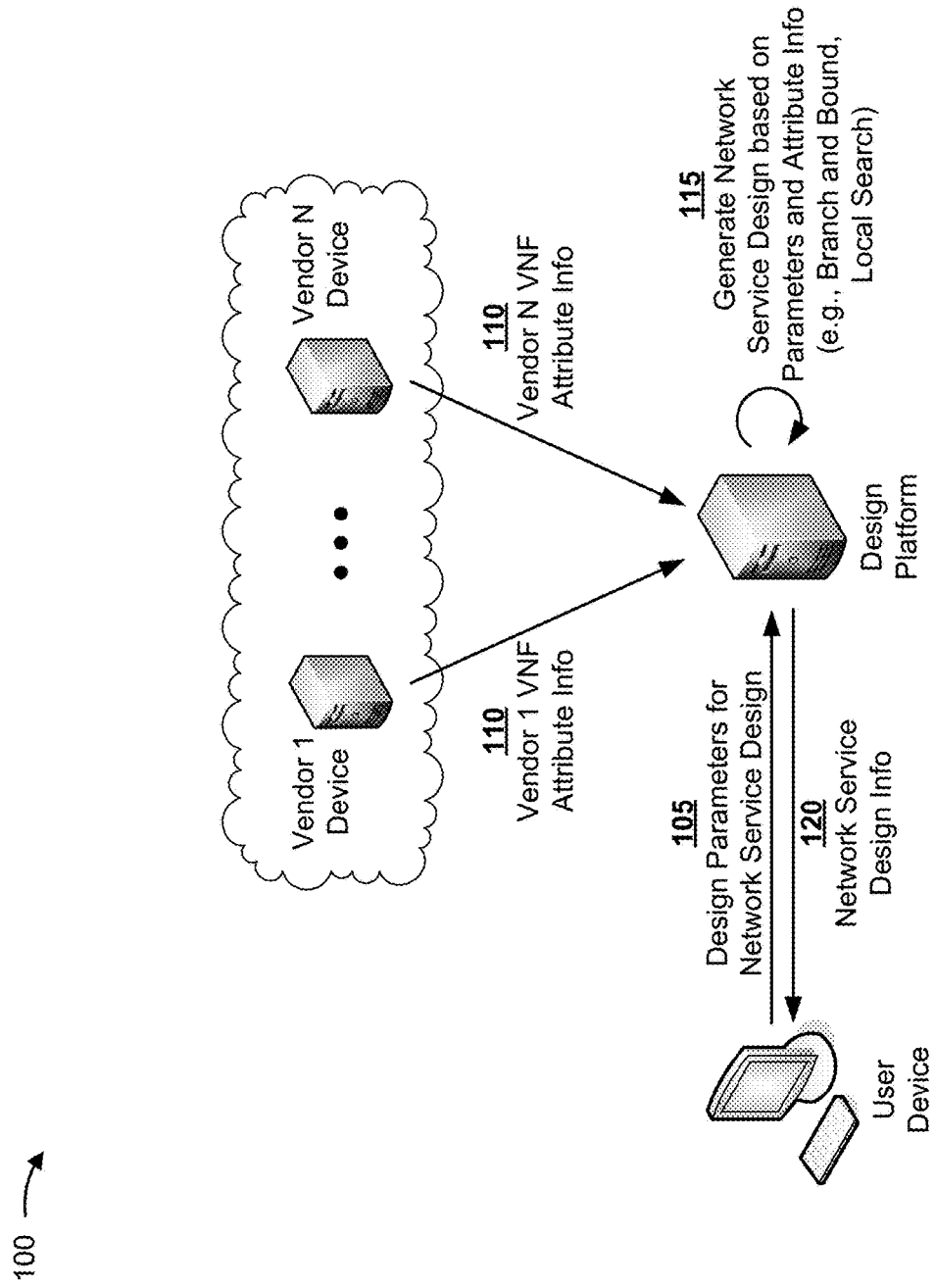
FIG. 1 is a diagram of an overview of an example implementation described herein.

FIG. 1 is a diagram of an overview of an example implementation 100 described herein. For the purposes of FIG. 1, assume that a design platform is capable of generating network service designs associated with providing network services using one or more VNFs. As shown in FIG. 1, and by reference number 105, a user device may provide, to the design platform, design parameters for a network service design. The design parameters may include information associated with one or more requirements, needs, constraints, characteristics, or the like, for the network service design associated with providing the network service using one or more VNFs.

As shown by reference number 110, the design platform may determine (e.g., based on information provided by vendor device 1 through vendor device N) attribute information associated with VNFs supported by a group of vendors (e.g., vendor 1 through vendor N). The attribute information may include information associated with an attribute of a VNF, such as information that identifies one or more network functions that may be configured on the VNF, information associated with a cost associated with the VNF, information associated with a capability associated with the VNF, or the like.

As shown by reference number 115, the design platform may generate a network service design based on the design parameters and the attribute information. In some implementations, the design platform may implement one or more combinatorial optimization techniques in order to generate the network service design, such as a local search technique, a branch and bound technique, a branch and bound technique with constraint propagation, a mixed integer linear programming technique, or the like. In some implementations, the design platform may generate multiple network service designs, and may identify one or more particular network service designs (e.g., a best network service design, a network service design that satisfies the design parameters, a network service design that has a lowest cost, a network service design that achieves a best performance).

As shown by reference number 120, the design platform may provide information associated with the network service design to the user device (e.g., such that the user may view the information associated with the network service design). In some implementations, the design platform may provide the information associated with the network service design in order to cause an action to be automatically performed, such as causing the network service design to be automatically deployed, causing the network service design to be automatically tested, or the like.

In this way, a design platform may receive information associated with requirements for a network service, and generate a network service design based on analyzing the requirements and information associated with a set of VNFs configured to perform one or more network functions associated with the network service. In some implementations, use of the one more combinatorial optimization techniques may allow the design platform to efficiently (e.g., in a short amount of time, with a reduced amount of resource consumption) generate the network service design. Moreover, generating the network service design in the manner described herein, may allow a network service design to be deployed that efficiently uses VNFs to implement the network service (e.g., such that the network service is not over-designed), thereby reducing consumption of computing resources and/or network resources by the VNFs when providing the network service.

As indicated above, FIG. 1 is provided merely as an example. Other examples are possible and may differ from what was described with regard to FIG. 1.

Figure 2:
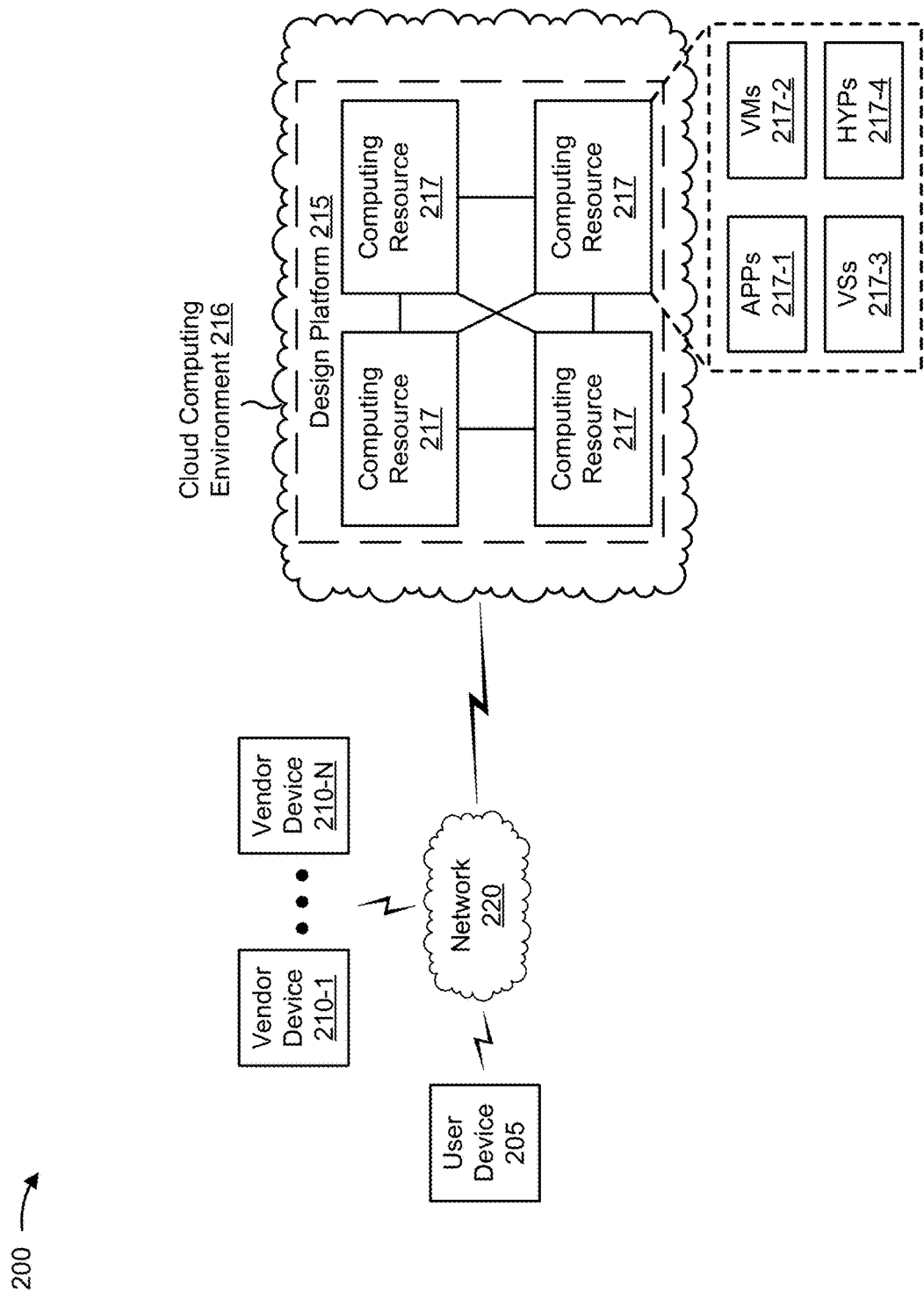
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, one or more vendor devices 210-1 through 210-N (N≥1) (hereinafter referred to collectively as vendor devices 210, and individually as vendor device 210), a design platform 215 hosted in a cloud computing environment 216, and a network 220. Devices of environment 200 may interconnect via wired connections, wireless connections, or a combination of wired and wireless connections.

User device 205 includes a device capable of receiving, storing, processing, and/or providing information associated with a network service design. For example, user device 205 may include a communication and computing device, such as a mobile phone (e.g., a smart phone, a radiotelephone, etc.), a laptop computer, a tablet computer, a handheld computer, a desktop computer, a server, a group of servers, a wearable communication device (e.g., a smart wristwatch, a pair of smart eyeglasses, etc.), or a similar type of device.

Vendor device 210 includes a device capable of receiving, determining, storing, and/or providing attribute information associated with a VNF. For example, vendor device 210 may include a software module instantiated in a virtual machine within cloud computing environment 216. Additionally, or alternatively, vendor device 210 may include one or more physical devices (e.g., a server or a group of servers) and/or one or more virtual devices within cloud computing environment 216. In some implementations, vendor device 210 may be capable of providing the attribute information to design platform 215. In some implementations, vendor device 210 may store or have access to attribute information associated with one or more VNFs associated with one or more vendors.

Design platform 215 includes one or more devices capable of generating a network service design based on attribute information, associated with a set of VNFs, and design parameters for a the network service design. For example, design platform 215 may include a server or a group of servers. In some implementations, design platform 215 may be capable of receiving the attribute information, associated with the set of VNFs, and the design parameters, and analyzing the attribute information and the design parameters in order to generate the network service design. Additionally, or alternatively, design platform 215 may be capable of providing information associated with the network service design to another device, such as user device 205.

In some implementations, as shown, design platform 215 may be hosted in cloud computing environment 216. Notably, while implementations described herein describe design platform 215 as being hosted in cloud computing environment 216, in some implementations, design platform 215 may not be cloud-based (i.e., may be implemented outside of a cloud computing environment) or may be partially cloud-based.

Cloud computing environment 216 may include an environment that hosts design platform 215. Cloud computing environment 216 may provide computation, software, data access, storage, etc. services that do not require end-user (e.g., user device 205) knowledge of a physical location and configuration of system(s) and/or device(s) that hosts design platform 215. As shown, cloud computing environment 216 may include a group of computing resources 217 (referred to collectively as computing resources 217 and individually as "computing resource 217").

Computing resource 217 includes one or more personal computers, workstation computers, server devices, or another type of computation and/or communication device. In some implementations, computing resource 217 may host design platform 215. The cloud resources may include compute instances executing in computing resource 217, storage devices provided in computing resource 217, data transfer devices provided by computing resource 217, etc. In some implementations, computing resource 217 may communicate with other computing resources 217 via wired connections, wireless connections, or a combination of wired and wireless connections.

As further shown in FIG. 2, computing resource 217 may include a group of cloud resources, such as one or more applications ("APPs") 217-1, one or more virtual machines ("VMs") 217-2, virtualized storage ("VSs") 217-3, one or more hypervisors ("HYPs") 217-4, or the like.

Application 217-1 may include one or more software applications that may be provided to or accessed by user device 205. Application 217-1 may eliminate a need to install and execute the software applications on user device 205. For example, application 217-1 may include software associated with design platform 215 and/or any other software capable of being provided via cloud computing environment 216. In some implementations, one application 217-1 may send/receive information to/from one or more other applications 217-1, via virtual machine 217-2.

Virtual machine 217-2 may include a software implementation of a machine (e.g., a computer) that executes programs like a physical machine. Virtual machine 217-2 may be either a system virtual machine or a process virtual machine, depending upon use and degree of correspondence to any real machine by virtual machine 217-2. A system virtual machine may provide a complete system platform that supports execution of a complete operating system ("OS"). A process virtual machine may execute a single program, and may support a single process. In some implementations, virtual machine 217-2 may execute on behalf of a user (e.g., user device 205), and may manage infrastructure of cloud computing environment 216, such as data management, synchronization, or long-duration data transfers.

Virtualized storage 217-3 may include one or more storage systems and/or one or more devices that use virtualization techniques within the storage systems or devices of computing resource 217. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 217-4 may provide hardware virtualization techniques that allow multiple operating systems (e.g., "guest operating systems") to execute concurrently on a host computer, such as computing resource 217. Hypervisor 217-4 may present a virtual operating platform to the guest operating systems, and may manage the execution of the guest operating systems. Multiple instances of a variety of operating systems may share virtualized hardware resources.

Network 220 includes one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
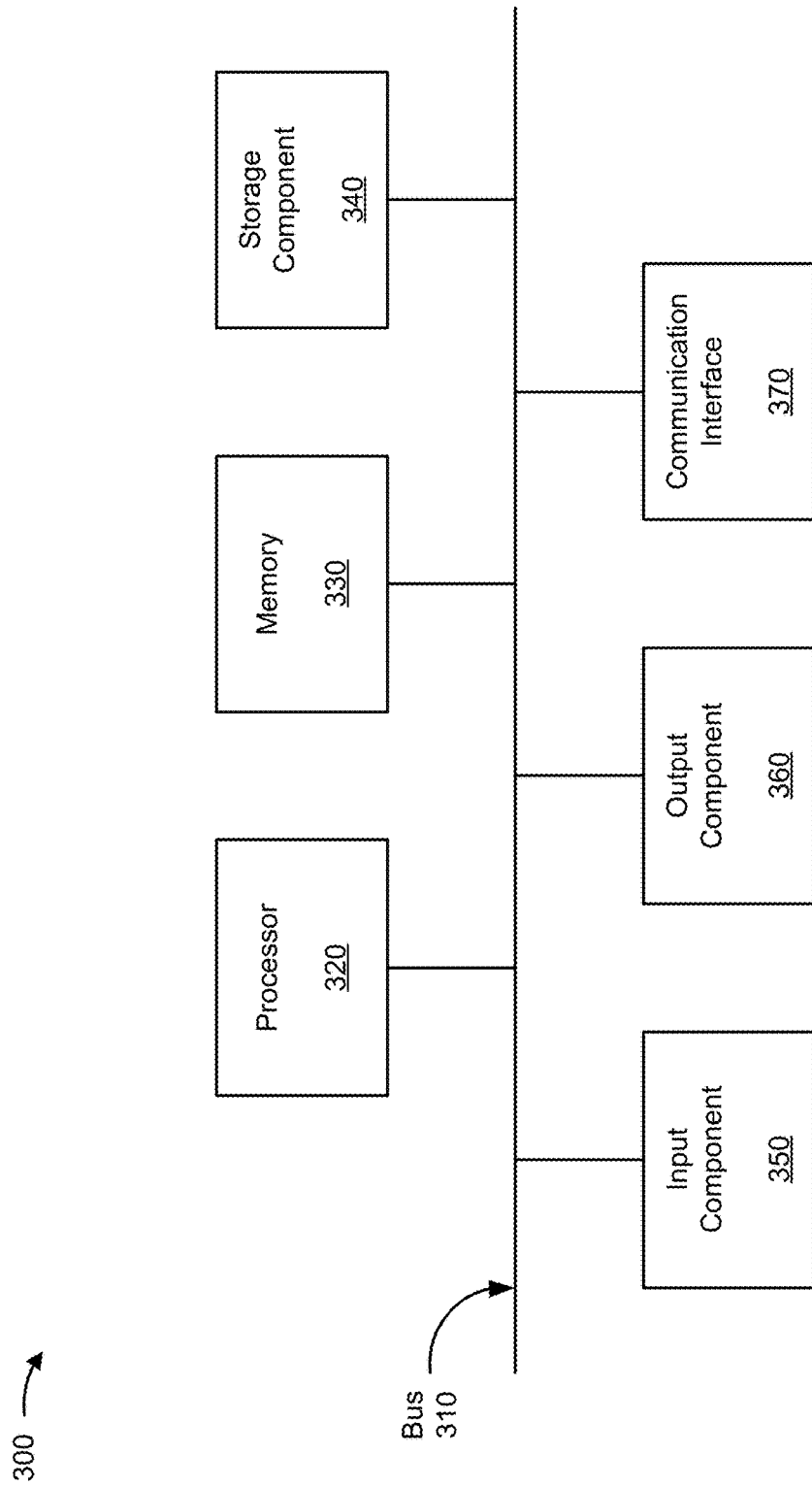
FIG. 3 is a diagram of example components of one or more devices of FIG. 2.

FIG. 3 is a diagram of example components of a device 300. Device 300 may correspond to user device 205, vendor device 210, and/or design platform 215. In some implementations, user device 205, vendor device 210, and/or design platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
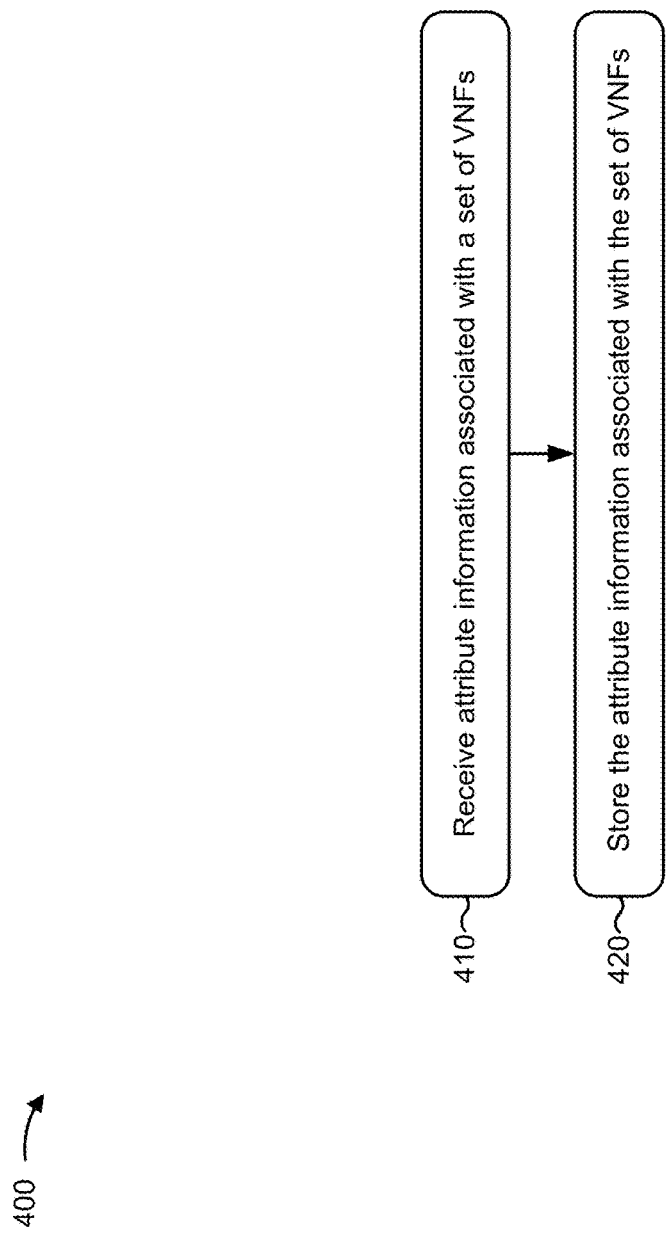
FIG. 4 is a flow chart of an example process for receiving and storing attribute information associated with a set of virtual network functions.

FIG. 4 is a flow chart of an example process 400 for receiving and storing attribute information associated with a set of VNFs. In some implementations, one or more process blocks of FIG. 4 may be performed by design platform 215. In some implementations, one or more process blocks of FIG. 4 may be performed by another device or a group of devices separate from or including design platform 215, such as another device of environment 200.

As shown in FIG. 4, process 400 may include receiving attribute information associated with a set of VNFs (block 410). For example, design platform 215 may receive attribute information associated with a set of VNFs. In some implementations, design platform 215 may receive the attribute information when another device provides the information, such as vendor device 210. Additionally, or alternatively, design platform 215 may receive the attribute information when design platform 215 requests the attribute information (i.e., design platform 215 may receive the attribute information in response to a request provided by design platform 215).

The attribute information may include information associated with an attribute of a VNF (e.g., a VNF supported by a vendor associated with vendor device 210). For example, the attribute information may include information that identifies one or more network functions that may be configured on the VNF, such a firewall function, a domain name service (DNS), a caching function, a network address translation (NAT), a uniform resource locator (URL) filtering function, or another type of network function. In some implementations, the VNF may be capable of performing multiple network functions (e.g., three different network functions, ten different network functions). Here, the attribute information may include information that identifies each of the multiple network functions.

As another example, the attribute information may include information associated with a cost associated with the VNF (herein referred to as cost information), such as a monetary cost associated with the VNF (e.g., dollars per instance of VNF, dollars per unit of electricity consumed during operation of the VNF, dollars per hour of operation, dollars per time of operation of the VNF), a cost in computing resources associated with the VNF (e.g., an amount of memory resources needed, an amount of processing resources needed, an amount of electricity needed, an amount of power consumption needed), or the like. In some implementations, the cost information may include a formula to be used to determine the cost of the VNF based on, for example, a design parameter for the network service design (e.g., a complexity parameter, a bandwidth parameter, a latency parameter), as described below. In some implementations, the cost information may correspond to one or more network functions supported by the VNF. For example, the cost information may include information associated with a cost corresponding to a single network function that may be configured on the VNF, a cost corresponding to multiple network functions that may be configured on the VNF, or the like.

As another example, the attribute information may include information associated with a capability associated with the VNF (herein referred to as capability information), such as a bandwidth capability of the VNF (e.g., a maximum rate at which an instance of the VNF may perform the network function), a latency capability of the VNF (e.g., an amount of delay to be expected during performance of the network function), a throughput capability of the VNF (e.g., an amount of throughput to be expected during performance of the network function), or the like. In some implementations, the capability information may include a formula to be used to determine the capability of the VNF based on, for example, a design parameter for the network service design, as described below. In some implementations, the capability information may correspond to one or more network functions supported by the VNF. For example, the capability information may include information associated with a capability corresponding to a single network function that may be configured on the VNF, a capability corresponding to multiple network functions that may be configured on the VNF, or the like.

In some implementations, design platform 215 may receive the attribute information from vendor device 210. For example, vendor device 210 may store or have access to attribute information for VNFs supported by a vendor corresponding to vendor device 210. Here, vendor device 210 may provide the attribute information to design platform 215 (e.g., automatically, in response to a request provided by design platform 215). In some implementations, a particular vendor device 210 may provide attribute information associated with multiple VNFs (e.g., attribute information corresponding to VNFs supported by the particular vendor device 210). In some implementations, design platform 215 may receive attribute information associated with multiple (e.g., tens, hundreds, thousands) VNFs, associated with multiple vendors, from multiple vendor devices 210.

In some implementations, a format in which the attribute information is provided to design platform 215 (e.g., a type of attribute information to be provided, a unit associated with the attribute information, a format of the attribute information) may be standardized across the multiple vendor devices 210 (e.g., such that design platform 215 receives attribute information of a type, a unit, and a format associated with generating a network service design). Additionally, or alternatively, design platform 215 may re-format the attribute information up receipt (e.g., such that the multiple vendor devices 210 may provide the attribute information in multiple formats).

Additionally, or alternatively, design platform 215 may receive the attribute information based on testing the VNF. For example, design platform 215 may obtain access to an instance of the VNF, and cause a traffic flow to be provided to the instance of the VNF (e.g., such that the VNF performs the network function on the traffic flow). Here, design platform 215 may monitor and/or measure one or more metrics associated with the VNF (e.g., bandwidth, latency, throughput), and may determine the attribute information, accordingly.

As further shown in FIG. 4, process 400 may include storing the attribute information associated with the set of VNFs (block 420). For example, design platform 215 may store the attribute information associated with the set of VNFs. In some implementations, design platform 215 may store the attribute information when design platform 215 receives the attribute information.

In some implementations, design platform 215 may store the attribute information in a memory location (e.g., a RAM, a hard disk, etc.) of design platform 215 and/or cloud computing environment 216. In some implementations, design platform 215 may store the attribute information such that design platform 215 may access the attribute information at a later time (e.g., for use in generating a network service design), as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
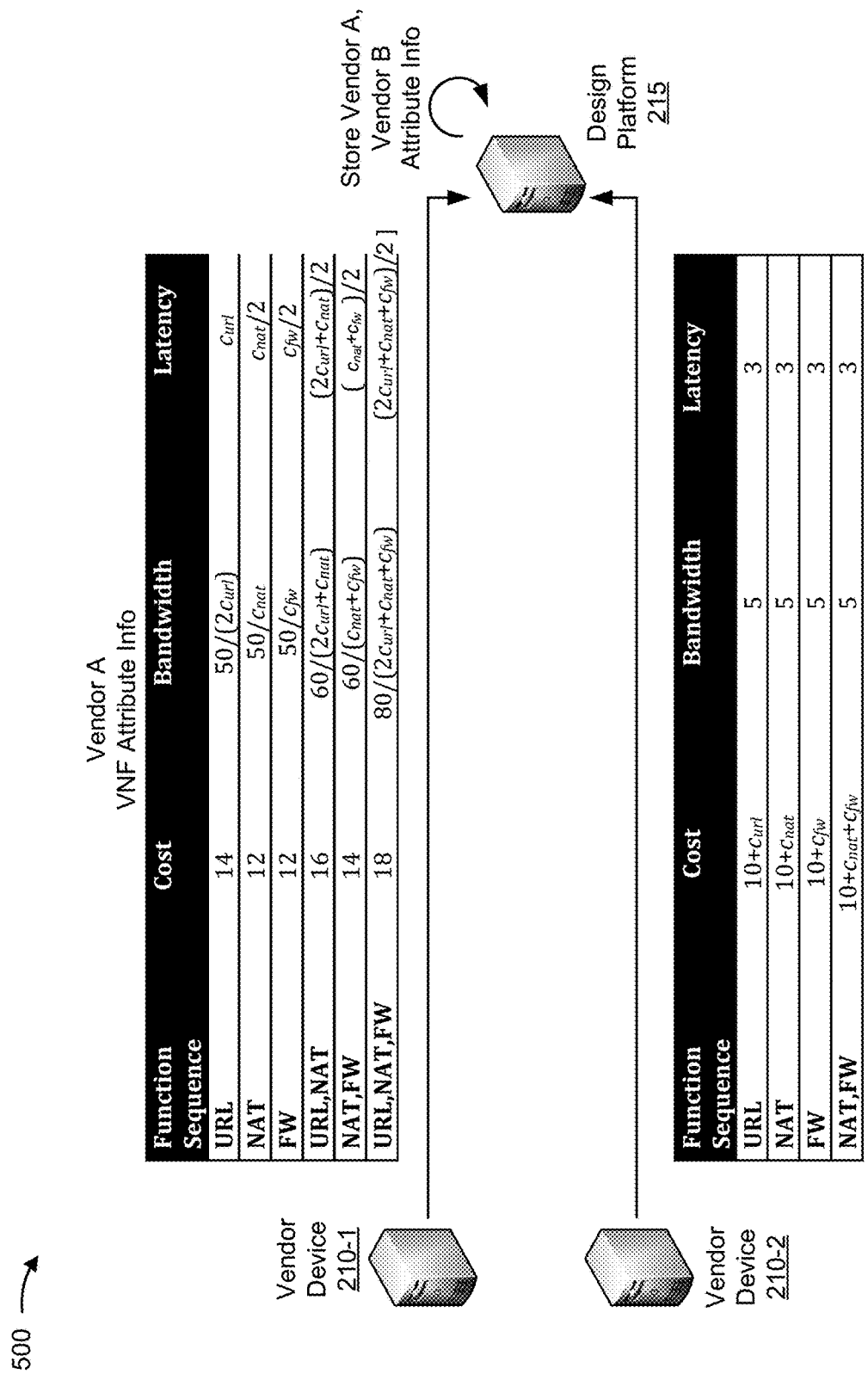
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that a first vendor device 210 (e.g., vendor device 210-1) stores or has access to first attribute information associated with a set of network functions that may be configured on a VNF supported by a first vendor (e.g., vendor A). Further, assume that a second vendor device 210 (e.g., vendor device 210-2) stores or has access to second attribute information associated with a set of network functions that may be configured on a VNF supported by a second vendor (e.g., vendor B).

As shown in FIG. 5, vendor device 210-1 may provide (e.g., based on a request provided by design platform 215) the first attribute information to design platform 215. As shown, the first attribute information may include information that identifies one or more network functions (e.g., a single network function, a combination of network functions) that may be configured on a VNF supported by the first vendor, and cost information and capability information associated with each of the one or more network functions.

As shown, a first set of network functions, capable of being performed by a VNF associated with the first vendor, may include a URL filtering function with a cost of 14, a bandwidth capability formula (e.g., indicating that a bandwidth capability of the VNF when performing the URL filtering function is equivalent to 50 divided by two times a complexity parameter of the URL filtering function: $BW=50/(2\,c_{url})$), and a latency capability formula (e.g., indicating that a latency capability of the VNF when performing the URL filtering function is equivalent to the complexity parameter of the URL filtering function: $Lat.=c_{url}$). Additional details regarding complexity parameters of network functions are described below with regard to FIG. 6.

As further shown, a second set of network functions, capable of being performed by a VNF associated with the first vendor, may include a NAT function with a cost of 12, a bandwidth capability formula (e.g., indicating that a bandwidth capability of the VNF when performing the NAT function is equivalent to 50 divided by a complexity parameter of the NAT function: $BW=50/c_{nat}$), and a latency capability formula (e.g., indicating that a latency capability of the VNF when performing the NAT function is equivalent to the complexity parameter of the NAT function divided by two: $Lat.=c_{nat}/2$).

As further shown, a third set of network functions, capable of being performed by a VNF associated with the first vendor, may include a firewall function with a cost of 12, a bandwidth capability formula (e.g., indicating that a bandwidth capability of the VNF when performing the firewall function is equivalent to 50 divided by a complexity parameter of the firewall function: $BW=50/c_{fw}$), and a latency capability formula (e.g., indicating that a latency capability of the VNF when performing the firewall function is equivalent to the complexity parameter of the firewall function divided by two: $Lat.=c_{fw}/2$).

As further shown, a fourth set of network functions, capable of being performed by a VNF associated with the first vendor, may include a sequence including the URL filtering function and the NAT function (herein referred to as a URL/NAT function) with a cost of 16, a bandwidth capability formula (e.g., indicating that a bandwidth capability of the VNF when performing the URL/NAT function is equivalent to 60 divided by two times the complexity parameter of the URL filtering function plus the complexity parameter of the NAT function: $BW=60/(2c_{url}+c_{nat})$), and a latency capability formula (e.g., indicating that a latency capability of the VNF when performing the URL/NAT function is equivalent to two times the complexity parameter of the URL filtering function plus the complexity parameter of the NAT function, divided by two: $Lat.=(2c_{url}+c_{nat})/2$).

As further shown, a fifth set of network functions, capable of being performed by a VNF associated with the first vendor, may include a sequence including the NAT function and the firewall function (herein referred to as a NAT/firewall function) with a cost of 14, a bandwidth capability formula (e.g., indicating that a bandwidth capability of the VNF when performing the NAT/firewall function is equivalent to 60 divided by the complexity parameter of the NAT function plus the complexity parameter of the firewall function: $BW=60/(c_{nat}+c_{fw})$), and a latency capability formula (e.g., indicating that a latency capability of the VNF when performing the NAT/firewall function is equivalent to the complexity parameter of the NAT function plus the complexity parameter of the firewall function, divided by two: $Lat.=(c_{nat}+c_{fw})/2$).

As further shown, a sixth set of network functions, capable of being performed by a VNF associated with the first vendor, may include a sequence including the URL filtering function, the NAT function, and the firewall function (herein referred to as a URL/NAT/firewall function) with a cost of 18, a bandwidth capability formula (e.g., indicating that a bandwidth capability of the VNF when performing the URL/NAT/firewall function is equivalent to 80 divided by two times the complexity parameter of the URL filtering function plus the complexity parameter of the NAT function plus the complexity parameter of the firewall function: $BW=80/(2c_{url}+c_{nat}+c_{fw})$), and a latency capability formula (e.g., indicating that a latency capability of the VNF when performing the URL/NAT/firewall function is equivalent to two times the complexity parameter of the URL filtering function plus the complexity parameter of the NAT function plus the complexity parameter of the firewall function, divided by two: $Lat.=(2c_{url}+c_{nat}+c_{fw})/2$).

As further shown in FIG. 5, vendor device 210-2 may provide the second attribute information to design platform 215. As shown, the second attribute information may information that identifies one or more network functions that may be configured on a VNF supported by the second vendor, and cost information and capability information associated with each of the one or more network functions.

As shown, a first set of network functions, capable of being performed by a VNF associated with the second vendor, may include a URL filtering function with a cost formula (e.g., indicating that a cost of the VNF when performing the URL filtering function is equivalent to 10 plus the complexity parameter of the URL filtering function: Cost=10+$c_{url}$), a bandwidth capability of 5, and a latency capability of 3.

As further shown, a second set of network functions, capable of being performed by a VNF associated with the second vendor, may include a NAT function with a cost formula (e.g., indicating that a cost of the VNF when performing the NAT function is equivalent to 10 plus the complexity parameter of the NAT function: Cost=10+$c_{nat}$), a bandwidth capability of 5, and a latency capability of 3.

As further shown, a third set of network functions, capable of being performed by a VNF associated with the second vendor, may include a firewall function with a cost formula (e.g., indicating that a cost of the VNF when performing the firewall function is equivalent to 10 plus the complexity parameter of the firewall function: Cost=10+$c_{fw}$), a bandwidth capability of 5, and a latency capability of 3.

As further shown, a fourth set of network functions, capable of being performed by a VNF associated with the second vendor, may include a sequence including the NAT function and the firewall function (herein referred to as a NAT/firewall function) with a cost formula (e.g., indicating that a cost of the VNF when performing the NAT/firewall function is equivalent to 10 plus the complexity parameter of the NAT function plus the complexity parameter of the firewall function: Cost=10+$c_{nat}$+$c_{fw}$), a bandwidth capability of 5, and a latency capability of 3.

As further shown, design platform 215 may store the attribute information, associated with the network functions that may be configured on VNFs supported by the first vendor and the second vendor, such that design platform 215 may generate a network service design based on the attribute information, as described below.

As indicated above, FIG. 5 is provided merely as an example. Other examples are possible and may differ from what was described with regard to FIG. 5.

Figure 6:
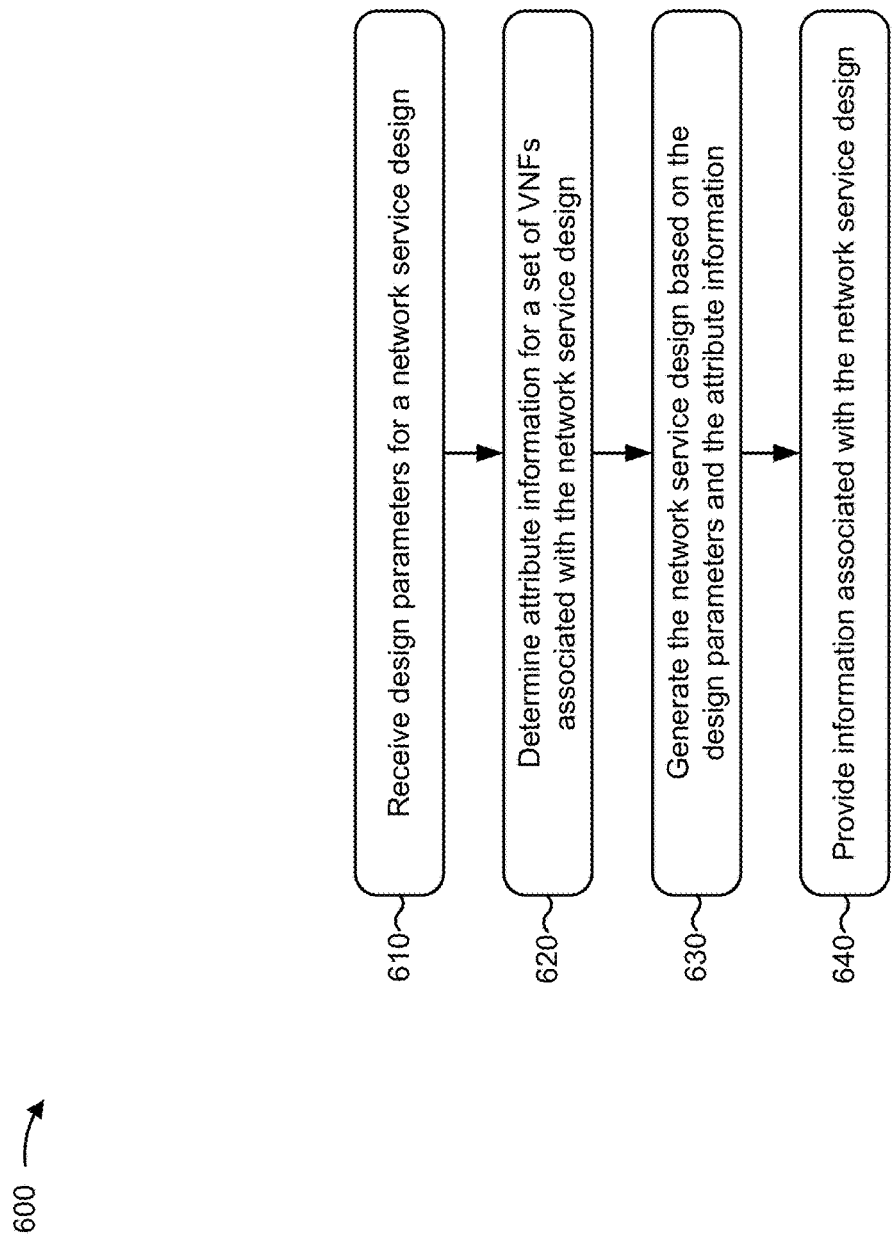
FIG. 6 is a flow chart of an example process for generating a network service design based on attribute information, associated with a set of virtual network functions, and design parameters for the network service design.

FIG. 6 is a flow chart of an example process 600 for generating a network service design based on attribute information, associated with a set of VNFs, and design parameters for the network service design. In some implementations, one or more process blocks of FIG. 6 may be performed by design platform 215. In some implementations, one or more process blocks of FIG. 6 may be performed by another device or a group of devices separate from or including design platform 215, such as another device of environment 200.

As shown in FIG. 6, process 600 may include receiving design parameters for a network service design (block 610). For example, design platform 215 may receive design parameters for a network service design. In some implementations, design platform 215 may receive the design parameters when another device provides the design parameters, such as user device 205. Additionally, or alternatively, design platform 215 may receive the design parameters when design platform 215 requests the design parameters (i.e., design platform 215 may receive the design parameters in response to a request provided by design platform 215).

The design parameters may include information associated with one or more requirements, needs, constraints, characteristics, or the like, for a network service design associated with providing a network service using one or more VNFs. In some implementations, the design parameters may be expressed in terms of a set of network functions and a set of traffic flows.

In some implementations, the design parameters may include information associated with the set of network functions associated with the network service design (e.g., network functions to be performed by the one or more VNFs). For example, the design parameters may include information that identifies a set of network functions, such as a name of the network function, a function identifier, or the like.

In some implementations, the design parameters may include a complexity parameter associated with one or more of the set of network functions. The complexity parameter may include information that identifies a complexity of the network function to be performed by the VNF. For example, a complexity parameter for a firewall function may correspond to a number of firewall rules associated with the firewall. As another example, a complexity parameter for a NAT function may correspond to a number of concurrent sessions expected to be supported by the NAT function. As still another example, a complexity parameter for a URL filtering function may correspond to a number and/or depth of filtering policies associated with URL filtering. Generally, the complexity parameter may correspond to a characteristic of a network function that negatively impacts performance of the network function as the nature of the characteristic increases (e.g., a firewall with 10 rules may be less complex than a firewall with 1000 rules). In other words, the complexity parameter may depend on a complexity of an algorithm required to implement the network function. In some implementations, the complexity parameter may be expressed in the form of a numerical value on a complexity scale (e.g., from 1 to 10, from 0.0 to 1.0), where each network function may have a corresponding complexity scale (e.g., a firewall complexity scale for firewall functions, a NAT complexity scale for NAT functions, a URL filtering complexity scale for URL filtering functions).

In some implementations, design platform 215 may determine the complexity parameter. For example, the design parameters may include information that identifies a number of rules associated with a firewall function. Here, design platform 215 may provide information associated with the number of rules as an input to a firewall complexity algorithm and may receive, as output, the complexity parameter (e.g., a value from 0 to 10). In some implementations, design platform 215 may receive and/or determine a set of complexity parameters, where each complexity parameter corresponds to a network function of the set of network functions associated with the network service design. Additionally, or alternatively, design platform 215 may receive the complexity parameter. For example, the design parameters may include information that identifies the complexity parameter as provided by the user (e.g., during input of the design parameters).

In some implementations, the design parameters may include information associated with the set of traffic flows associated with the network service design. For example, the design parameters may include information that identifies a traffic flow (e.g., a name of a traffic flow, a traffic flow identifier, a type of traffic associated with the traffic flow), information that identifies a subset of the set of network functions (e.g., a single network function, fewer than all of the set of network functions, all of the set of network functions) that is to be performed for the traffic flow, an order in which the subset of network functions is to be performed for the traffic flow, or the like. In some implementations, the design parameters may include information associated with multiple traffic flows, and may indicate that different subsets of the set of network functions are to be performed for the multiple traffic flows.

As another example, the design parameters may include information associated with a performance parameter for the set of traffic flows. For example, the design parameters may include one or more performance parameters associated with a traffic flow, such as a bandwidth parameter associated with the traffic flow (e.g., a minimum acceptable amount of bandwidth), a latency parameter associated with the traffic flow (e.g., a maximum acceptable amount of latency), a throughput parameter associated with the traffic flow (e.g., a minimum acceptable amount of throughput), or the like. In some implementations, the design parameters may include performance parameters for one or more traffic flows of the set of traffic flows.

As another example, the design parameters may include one or more cost parameters that are to be satisfied by the network service design, such as monetary cost parameter (e.g., a maximum acceptable cost in dollars for the network service design, a maximum acceptable cost in dollars for a particular network function associated with the network service design), a resource cost threshold associated with the network service design (e.g., a maximum acceptable cost in memory resources, a maximum acceptable cost in processing resources, a maximum acceptable cost in power consumption, a maximum acceptable cost in network resources), or the like.

Additionally, or alternatively, the design parameters may include information associated with design objectives for the network service design that involve one or more cost parameters and/or one or more performance parameters. For example, the design parameters may include information indicating that the network service design is to maximize bandwidth for one or more traffic flows, while satisfying a latency threshold, for a fixed overall cost. As another example, the design parameters may include information indicating that the network service design is to satisfy a latency threshold and a throughput threshold with a lowest possible cost.

Additionally, or alternatively, the design parameters may include information associated with a fixed parameter. For example, the design parameters may include information that identifies a particular vendor that is to be used for a particular network function.

In some implementations, design platform 215 may receive the design parameters from user device 205. For example, a user may provide, to user device 205, user input associated with the design parameters. Here user device 205 may provide the design parameters to design platform 215. Additionally, or alternatively, design platform 215 may receive the design parameters from another device. For example, design platform 215 may receive default design parameters from vendor device 210 and/or from a memory location of design platform 215.

As further shown in FIG. 6, process 600 may include determining attribute information for a set of VNFs associated with the network service design (block 620). For example, design platform 215 may determine attribute information for a set of VNFs associated with the network service design. In some implementations, design platform 215 may determine the attribute information for the set of VNFs when (e.g., before, concurrently with, after) design platform 215 receives the design parameters associated with the network service design.

In some implementations, design platform 215 may determine the attribute information based on receiving and/or storing the attribute information, in a manner similar to that described above with regard to FIG. 4.

As further shown in FIG. 6, process 600 may include generating the network service design based on the design parameters and the attribute information (block 630). For example, design platform 215 may generate the network service design based on the design parameters and the attribute information. In some implementations, design platform 215 may generate (e.g., automatically) the network service design when design platform 215 receives the design parameters and/or when design platform 215 determines the attribute information. Additionally, or alternatively, design platform 215 may generate the network service design when design platform 215 receives information indicating that design platform 215 is to generate the network service design from another device, such as user device 205.

The network service design may include information associated with one or more VNFs that are capable of performing the set of network functions identified based on the design parameters. For example, in some implementations, the network service design may include information associated with one or more vendors of the one or more VNFs included in the network service design, such as a vendor name, a vendor identifier, a vendor product name, a vendor product identifier, or the like. Additionally, or alternatively, the network service design may include information that identifies an expected performance metric associated with the set of traffic flows corresponding to the network service design (e.g., on an overall basis, on a per VNF basis, on a per traffic flow basis), such as an expected amount of bandwidth, an expected amount of latency, an expected amount of throughput. Additionally, or alternatively, the network service design may include information that identifies an expected cost associated with the network service design (e.g., on an overall basis, on a per VNF basis, on a per hour basis, on a time period basis).

In some implementations, design platform 215 may generate the network service design based on implementing a combinatorial optimization technique, such as a local search technique, a brand and bound technique, a branch and bound technique with constraint propagation, a mixed integer linear programming technique, or the like. In some implementations, design platform 215 may generate the network service design based on implementing a combination of two or more combinatorial optimization techniques, such as a combination of the local search technique and the brand and bound technique with constraint propagation, or the like. Additionally, or alternatively, design platform 215 may generate multiple network service designs using different combinatorial optimization techniques.

When implementing the local search technique, design platform 215 may start by identifying (e.g., randomly, based on user input, based on a matching algorithm) a first network service design (e.g., a network service design that does not satisfy the design parameters, that nearly satisfies the design parameters, that satisfies the design parameters). For example, design platform 215 may generate the first network service design by assigning, based on the attribute information, one or more VNFs to perform the one or more network functions for the one or more traffic flows identified in the design parameters. Next, design platform 215 may make an incremental modification (e.g., change a VNF assignment for a particular network function) to the first network service design in order to generate a second network service design. Here, design platform 215 may compare the first network service design and the second network service design in order to determine whether the second network service design is an improvement over the first network service design. For example, design platform 215 may determine whether the second network service design is an improvement toward satisfying the design parameters (e.g., when the first network service design does not satisfy one or more design parameters), whether the second network service design has a reduced cost without a reduction in performance, whether the second network service design has an increased performance metric without an increase in cost, or the like.

Here, if the second network service design is an improvement over the first network service design, then design platform 215 may make another incremental modification to the second network service design in order to create a third network service design. Design platform 215 may then compare the second network service design and the third network service design in order to determine whether the third network service design is an improvement over the second network service design, and so on.

Conversely, if the second network service design is not an improvement over the first network service design, then design platform 215 may return to the first network service design and make a different incremental modification to the first network service design in order to create the third network service design. Design platform 215 may then compare the first network service design and the third network service design in order to determine whether the third network service design is an improvement over the first network service design, and so on.

When using the local search technique, design platform 215 may continue making incremental changes to the network service design until design platform 215 generates a network service design that satisfies the design parameters, until a threshold amount of search time expires (e.g., a default amount of time, an amount of time determined based on user input), until a user provides input indicating that design platform 215 is to stop the local search, or the like.

In some implementations, design platform 215 may make a random incremental modification during the local search (e.g., a modification that may reduce performance of the network service design, that may increase a cost of the network service design) in order to perform simulated annealing (e.g., in order to increase a likelihood that a better network service design may be generated). Additionally, or alternatively, design platform 215 may make an incremental change, during the local search, based on user input.

In some implementations, implementation of the local search technique may allow design platform 215 to generate the network service design in a relatively short period of time (e.g., as compared to the branch and bound technique) while providing a network service design that satisfies the design parameters, thereby conserving computing resources and/or network resources associated with generating the network service design.

When implementing the branch and bound technique, design platform 215 may generate multiple (e.g., all, nearly all, a predetermined number) possible network service designs in order to identify a best network service design of those generated. The best network service design may include a network service design that satisfies the design parameters with a lowest cost (e.g., as compared to other possible network service designs), a network service design that maximizes performance with a fixed cost, a network service design that satisfies the design parameters with a lowest cost, or the like. In some implementations, design platform 215 may search for the best network service design using, for example, the branch and bound technique with constraint propagation.

In some implementations, design platform 215 may implement the branch and bound technique with constraint propagation by performing a series of steps. A first step may include creating sets of load balance groups, associated with the set of traffic flows, based on the design parameters. Here, a load balance group corresponds to a performance of one or more network functions on one or more traffic flows. A second step may include selecting a set of load balance groups, of the sets of load balance groups, based on which network service designs are to be generated. A third step may include assigning, based on the attribute information, VNFs to the load balance groups in the selected set of load balance groups. A fourth step may include adding instances of the VNFs sufficient to satisfy the design parameters associated with the network functions provided by the VNFs. A result of performing these steps includes a network service design. Here, design platform 215 may compare the network service design to a previous best network service design (e.g., a best network service design generated at an earlier time) in order to determine whether the network service design is a new best network service design (i.e., whether the newly generated network service design is an improvement over the previously generated best network service design). A detailed example of this process is described below with regard to FIGS. 7A-7E.

In some implementations, when creating the sets of load balance groups, design platform 215 may create a set of load balance groups for multiple (e.g., each) possible combinations of traffic flows and network functions. In some implementations, design platform 215 may create the sets of load balance groups based on the design parameters (e.g., that identifies which the type and order of network functions to be performed on each traffic flow) and the attribute information (e.g., that identifies VNFs capable of performing the network functions).

In some implementations, a load balance group may include a traffic flow and a network function (e.g., a single traffic flow and a single network function). Additionally, or alternatively, a load balance group may include two or more adjacent network functions (e.g., a first network function that is to be performed on one or more traffic flows immediately before a second network function is performed on the one or more traffic flows). Additionally, or alternatively, a load balance group may include two or more traffic flows (e.g., when a particular network function is to be performed on each of the two or more traffic flows, the load balance group may include the particular network function and the two or more traffic flows).

In some implementations, when selecting the set of load balance groups based on which network service designs are to be generated, design platform 215 may select a load balance group based on a priority associated with the sets of load balance groups. For example, design platform 215 may select a set of load balance groups with a fewest number of load balance groups as an initial set of load balance groups based on which network service designs are to be generated. Here, after design platform 215 performs iterations associated with the initial set of load balance groups (i.e., after design platform 215 generates and compares all possible network service designs that may be generated based on the set of load balance groups), design platform 215 may select a set of load balance groups with a next fewest number of load balance groups, and so on. Configuring design platform 215 to select the sets of load balance groups in this manner may allow design platform 215 to generate network service designs with lower cost network service designs (e.g., due to fewer VNFs resulting from the fewer load balance groups) more efficiently (e.g., in less time, using fewer computing and/or network resources). This may also reduce and/or eliminate network service design generation associated with subsequent sets of load balance groups (e.g., where a bound associated with a first generated lower cost network service design may cause a partial network service design to be abandoned earlier during generation). Further, this may conserve computing resources and/or network resources consumed by design platform 215 when generating the network service design.

In some implementations, when assigning the VNFs to the load balance groups of the selected set of load balance groups, design platform 215 may identify a VNF for each load balance group of the set, where the identified VNF must be capable of performing the one or more network functions associated with the load balance group. Here, design platform 215 may identify the VNF based on the attribute information associated with the VNFs In some implementations, design platform 215 may assign the VNFs to the load balance groups based on a priority associated with the load balance groups. For example, design platform 215 may assign a VNF to a load balance group including a highest number of total network functions and/or traffic flows first, may assign a VNF to a load balance group including a next highest number of total network functions and/or traffic flows second, and so on. Here, load balance groups with a higher number of total network functions and/or traffic flows may be higher cost, with fewer feasible network service designs. As such, these load balance groups may contribute more significantly to an overall cost of the network service design. This may allow design platform 215 to determine that a partial network service design (e.g., a network service design for which not all load balance groups have been assigned a VNF) may be abandoned sooner during generation (e.g., before additional VNFs are assigned to other load balance groups in the set), as described below. This may result in conservation of computing resources and/or network resources of design platform 215.

In some implementations, design platform 215 may calculate a cost bound associated with a partial network service design (e.g., a minimum possible overall cost associated with the partial network service design) during assignment of the VNFs. Here, if the cost bound is not less than the cost of the best network service design (i.e., the lowest cost network service design generated by design platform 215 thus far) or that the cost bound does not satisfy a cost parameter, then design platform 215 may abandon the partial network service design (e.g., since the partial network service design will not lead to a lower cost network service design or a network service design that satisfies the cost parameter).

Additionally, or alternatively, design platform 215 may calculate a latency bound for a traffic flow, associated with the partial network service design (e.g., a minimum possible latency for the traffic flow), during assignment of the VNFs. Here, if the latency bound exceeds a latency parameter associated with the traffic flow (e.g., a latency parameter identified in the design parameters), then design platform 215 may abandon the partial network service design.

In this way, design platform 215 may implement the branch and bound technique such that design platform 215 abandons a partial network service design that cannot be included in a network service design that improves upon a previously generated best network service design. As such, the implementation of the branch and bound technique by design platform 215 may reduce consumption of computing resources (e.g., processing resources, memory resources) and/or network resources during generation of the network service design.

In some implementations, when adding instances of the VNFs sufficient to satisfy the design parameters associated with the network functions provided by the VNF, design platform 215 may add VNF instances to the load balance group such that a design parameter is satisfied. For example, design platform 215 may add instances of the VNF such that a bandwidth parameter, associated with a traffic flow and included in the design parameters, is satisfied. Here, since each added VNF instance may increases the cost of the network service design, design platform 215 may abandon a partial network service design when a cost bound meets or exceeds the cost associated with the best network service design and/or does not satisfy a cost parameter, as described above. This may conserve computing resources and/or network resources consumed by design platform 215 when generating the network service design.

In some implementations, design platform 215 may perform multiple iterations of these steps for the selected set of load balance groups. For example, design platform 215 may perform an iteration for multiple possible combinations of VNFs that may be assigned to the load balance groups. After design platform 215 completes the multiple iterations associated with the selected set of load balance groups, design platform 215 may select another set of load balance groups and repeat this process. In this way, design platform 215 may generate network service designs corresponding to multiple possible combinations of VNFs for multiple sets of load balance groups.

As described above, in some implementations, design platform 215 may propagate one or more constraints at each search step (e.g., such that design platform 215 does not perform one or more steps for a particular iteration). In such a case, if the one or more constraints indicate that a network service design resulting from a partial network service design will not result in a best network service design or a network service design that satisfies the design parameters, then design platform 215 may abandon the partial network design and perform another iteration (e.g., based on another set of load balance groups, based on a different assignment of VNFs). This may conserve computing resources and/or network resources consumed by design platform 215 during generation of the network service design.

Additionally, or alternatively, design platform 215 may be configured to consider constraints (i.e., use constraint propagation) in conjunction with the branch and bound technique. For example, design platform 215 may be configured to constrain (i.e., limit) a total number of VNF instances in the network service design, thereby reducing a number of network service designs to be considered by design platform 215. This may allow for increased efficiency of design platform 215 and/or reduced resource consumption by design platform 215 when applying the branch and bound technique.

In some implementations, design platform 215 may use heuristics in order to improve implementation of the branch and bound technique with constraint propagation. For example, design platform 215 may begin generating a network service design based on a previously generated portion of a network service design (e.g., a portion of a previously generated network service design with a high performance, a low cost), based on prioritizing an order in which alternatives (e.g., different sets of load balance groups, different combinations of VNFs) for the network service design are generated (e.g., such that higher performance and/or lower cost options are searched first), or the like.

In some implementations, design platform 215 may implement a parallel search algorithm that allows design platform 215 to concurrently generate and compare different network service designs.

In some implementations, implementation of the branch and bound technique may allow design platform 215 to generate an optimal or near-optimal network service design (e.g., by exploring all or nearly all possible network service designs). In some implementations, design platform 215 may implement the branch and bound technique for a period of time (e.g., a default period of time, a period of time identified based on user input), and may identify one or more best network service designs (e.g., a best network service design, a best five network service designs) upon expiration of the period of time.

In some implementations, a result of generating the network service design generated by design platform 215 (e.g., using the local search technique, the branch and bound technique with or without the constraint propagation technique) may include one or more network service designs (e.g., a set of a best five network service designs, a set of a first ten network service designs that satisfy the design parameters). As described above, the network service design may identify a vendor associated with a VNF that may be used within the network service design, an expected cost associated with the network service design, an expected performance metric associated with the network service design, or the like.

As further shown in FIG. 6, process 600 may include providing information associated with the network service design (block 640). For example, design platform 215 may provide information associated with the network service design. In some implementations, design platform 215 may provide the information associated with the network service design when (e.g., before, concurrently with, after) design platform 215 generates the network service design. In some implementations, design platform 215 may provide the information associated with the network service design in real-time or near real-time as the network service designs are generated (e.g., such that a user may provide feedback and/or guidance associated with the network service design). Additionally, or alternatively, design platform 215 may provide the information associated with the network service design when design platform 215 receives information indicating that design platform 215 is to provide the information associated with the network service design from another device, such as user device 205.

In some implementations, design platform 215 may provide the information associated with the network service design to user device 205 such that the information associated with the network service design is provided for display to a user. For example, design platform 215 may provide, to user device 205, information associated with a set of network service designs that satisfy the design parameters. Here, user device 205 may provide the information associated with the set of network service designs for display to the user (e.g., such that the user may compare the network service designs and select a particular network service design for deployment).

Additionally, or alternatively, design platform 215 may provide the information associated with the network service design in order to cause an action to be automatically performed. For example, design platform 215 may provide the information associated with the network service design in order to cause the network service design to be automatically deployed (i.e., automatically cause the VNFs, associated with the network service design, to be configured). Here, design platform 215 may automatically provide (e.g., to user device 205 associated with a customer) that the network service design has been deployed and/or is ready to begin processing traffic flows.

As another example, design platform 215 may provide the information associated with the network service design in order to cause testing, associated with the network service design, to be automatically performed. Here, design platform 215 may cause the network service design to deployed (e.g., by automatically configuring VNFs associated with the network service design), may cause one or more test traffic flows to be provided to the VNFs, and may monitor one or more performance metrics associated with the test traffic flows. This may allow design platform 215 to verify that the network service design satisfies the design parameters (e.g., before handling customer traffic flows). In some implementations, design platform 215 may perform automatic testing for multiple network service designs (e.g., a best five network service designs) in order to identify a particular network service design (e.g., a network service design to be used for handling customer traffic flows) to recommend to user device 205.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. For the purposes of example implementation 700, assume that design platform 215 is configured to implement the branch and bound technique with constraint propagation in order to generate a network service design that has a lowest cost while satisfying performance parameters associated with the network service design. Further, assume that design platform 215 stores or has access to attribute information associated with a set of VNFs supported by a first vendor (e.g., vendor A) and a second vendor (e.g., vendor B), as described above with regard to FIG. 5.

Figure 7A:
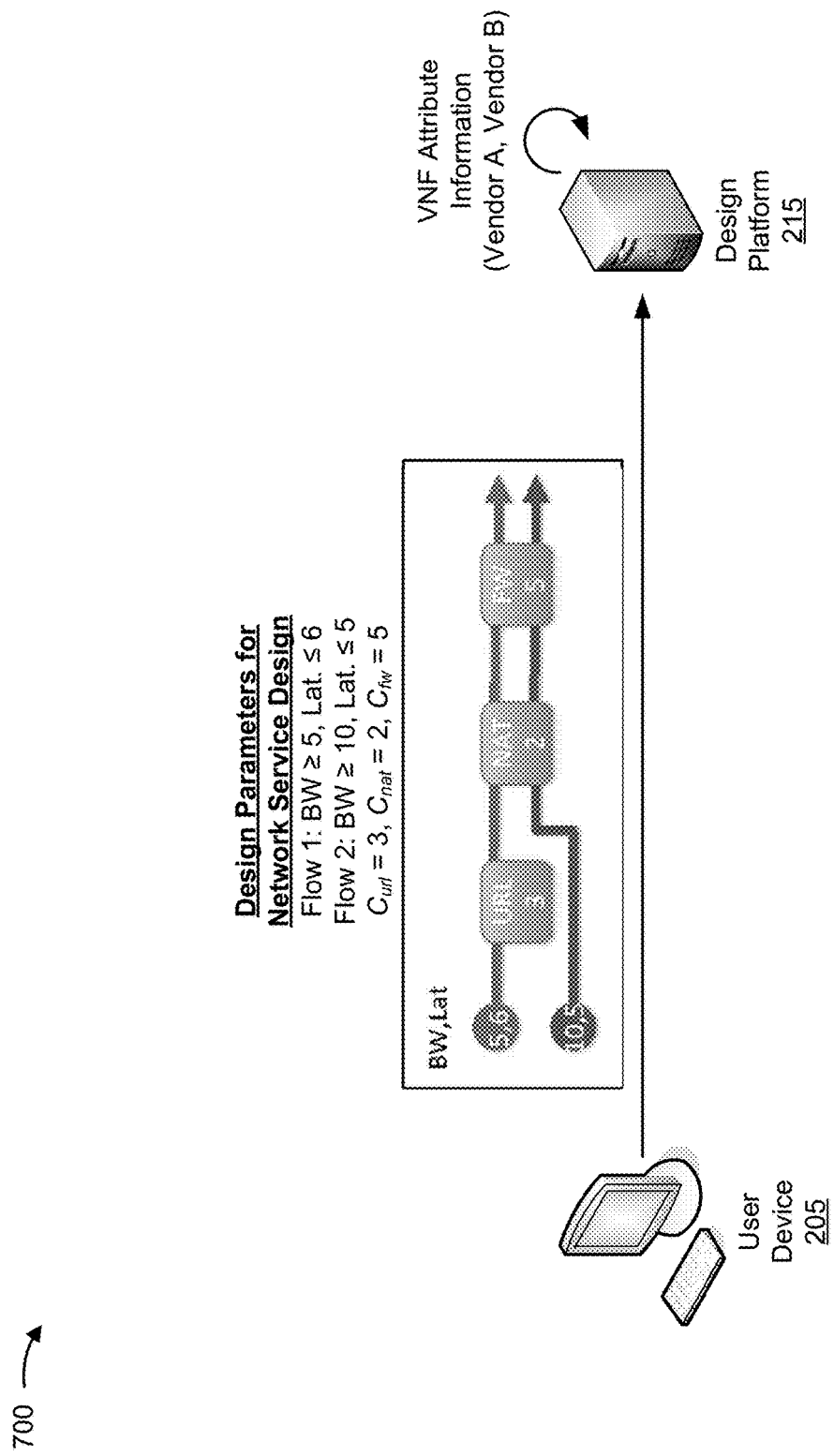
FIGS. 7A-7E are diagrams of an example implementation relating to the example process shown in FIG. 6.

As shown in FIG. 7A, design platform 215 may receive, from user device 205, design parameters for a network service design. As shown, the design parameters may identify a first traffic flow (e.g., flow 1), a bandwidth parameter for the first traffic flow (e.g., flow 1 requires an amount of bandwidth that is greater than or equal to 5), and a latency parameter for the first traffic flow (e.g., flow 1 requires an amount of latency that is less than or equal to 6). As further shown, the design parameters may identify a second traffic flow (e.g., flow 1), a bandwidth parameter for the second traffic flow (e.g., flow 2 requires an amount of bandwidth that is greater than or equal to 10), and a latency parameter for the second traffic flow (e.g., flow 2 requires an amount of latency that is less than or equal to 5).

As further shown in FIG. 7A, the design parameters may also indicate that a URL filtering function, a NAT function, and a firewall function are to be performed on the first traffic flow, and that the NAT function and the firewall function are to be performed on the second traffic flow. As further shown, the design parameters may include a complexity parameter of the URL filtering function (e.g., $c_{url}$=3), a complexity parameter of the NAT function (e.g., $c_{nat}$=2, and a complexity parameter of the firewall function (e.g., $c_{fw}$=5).

As further shown, design platform 215 may determine the attribute information for the VNFs supported by vendor A and vendor B. For example, design platform 215 may search attribute information, stored or accessible by design platform 215, and may determine that the vendor A and vendor B VNFs are capable of supporting the network functions identified in the design parameters.

Figure 7B:
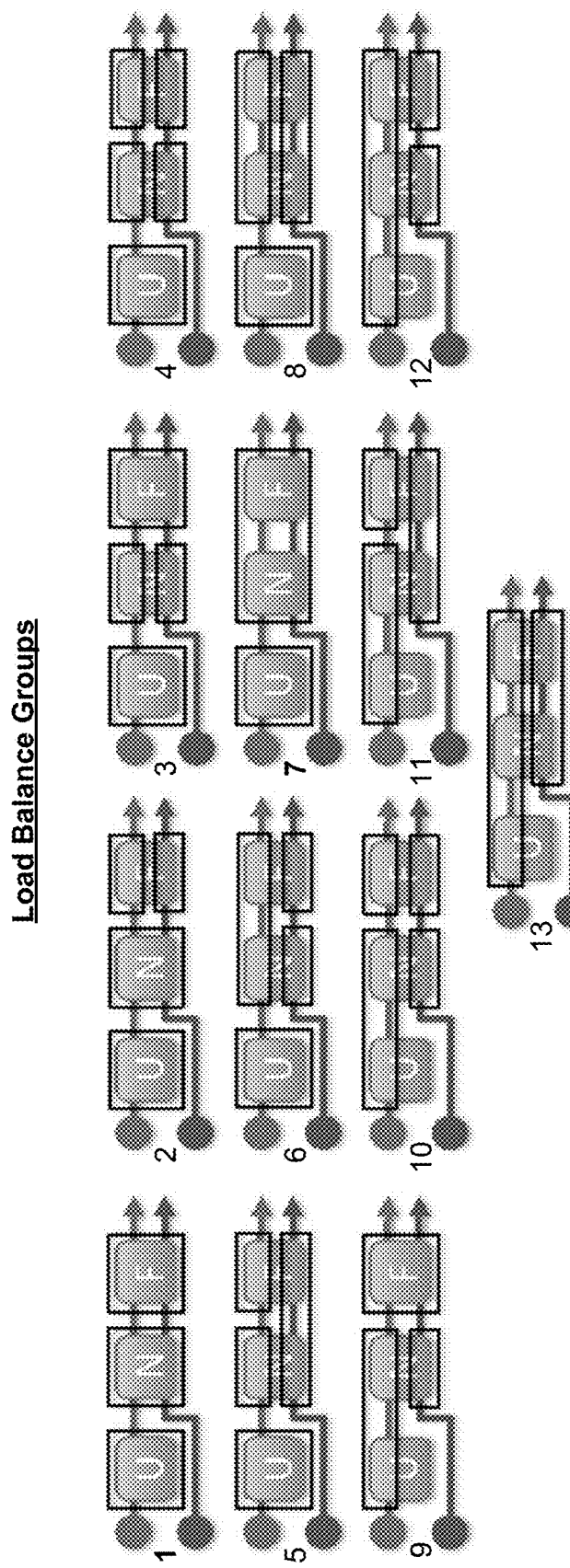

As shown in FIG. 7B, design platform 215 may begin implementing the branch and bound technique with constraint propagation in order to generate the network service design. As shown, design platform 215 may create sets of load balance groups, associated with the first traffic flow and the second traffic flow, based on the design parameters.

For example, a first set of load balance groups (identified as "1" in FIG. 7B), may include three load balance groups, where a first load balance group may correspond to the URL filtering function for the first traffic flow, a second load balance group may correspond to the NAT function for the first traffic flow and the second traffic flow, and a third load balance group may correspond to the firewall function for the first traffic flow and the second traffic flow.

As another example, a second set of load balance groups (identified as "2" in FIG. 7B), may include four load balance groups, where a first load balance group may correspond to the URL filtering function for the first traffic flow, a second load balance group may correspond to the NAT function for the first traffic flow and the second traffic flow, a third load balance group may correspond to the firewall function for the first traffic flow, and a fourth load balance group may correspond to the firewall function for the second traffic flow. As shown in FIG. 7B, design platform 215 may create all possible sets of load balance groups for generating a network service design that satisfies the design parameters.

Figure 7C:
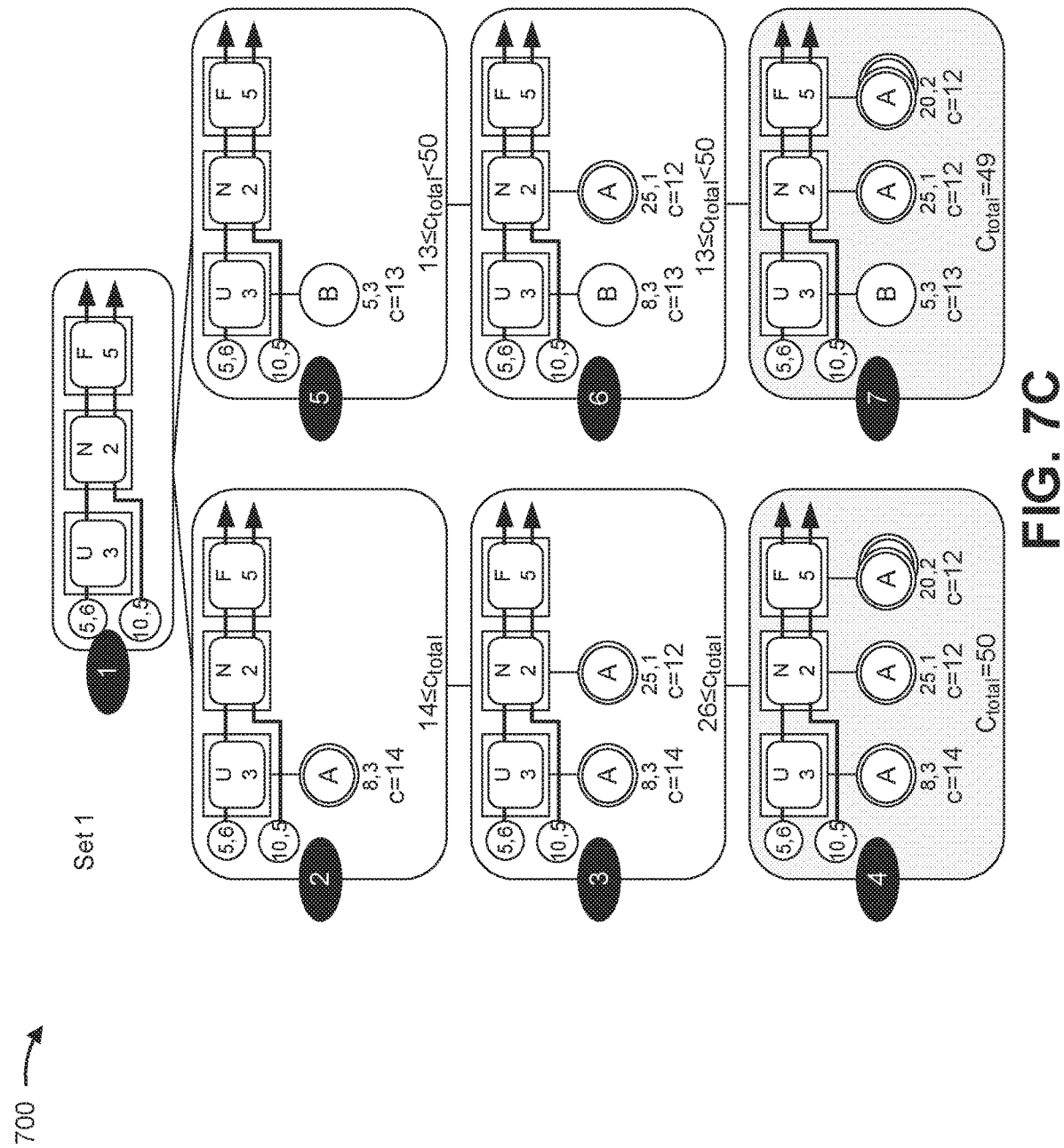

As shown in FIG. 7C, at step 1, design platform 215 may select the first set of load balance groups as the set of load balance groups based on which design platform 215 will initially generate network service designs.

As further shown, at step 2, design platform 215 may assign a vendor A VNF to perform the URL filtering function for the first traffic flow. As shown, design platform 215 may determine, based on the attribute information and the design parameters, a bandwidth capability of the vendor A VNF configured to perform the URL filtering function (e.g., BW=50/($2c_{url}$)=50/(2×3)=8), a latency capability of the vendor A VNF configured to perform the URL filtering function (e.g., Lat.=$c_{url}$=3), and a cost of the vendor A VNF configured to perform the URL filtering function (e.g., Cost=14). Here, one instance of the vendor A VNF configured to perform the URL filtering function is sufficient since the bandwidth capability of the VNF (e.g., 8) meets or exceeds the bandwidth parameter for the first traffic flow of (e.g., 5)

As further shown, at step 3, design platform 215 may assign a vendor A VNF to perform the NAT function for the first traffic flow and the second traffic flow. As shown, design platform 215 may determine, based on the attribute information and the design parameters, a bandwidth capability of the vendor A VNF configured to perform the NAT function (e.g., BW=50/$c_{nat}$=50/2=25), a latency capability of the vendor A VNF configured to perform the NAT function (e.g., Lat.=$c_{nat}$/2=2/2=1), and a cost of the vendor A VNF configured to perform the NAT function (e.g., Cost=12). Here, one instance of the vendor A VNF configured to perform the NAT function is sufficient since the bandwidth capability of the VNF (e.g., 25) meets or exceeds the bandwidth parameter for the first traffic flow plus the bandwidth parameter of the second traffic flow (e.g., 5+10=15).

As further shown, at step 4, design platform 215 may assign a vendor A VNF to perform the firewall function for the first traffic flow and the second traffic flow. As shown, design platform 215 may determine, based on the attribute information and the design parameters, a bandwidth capability of the vendor A VNF configured to perform the firewall function (e.g., BW=50/$c_{fw}$=50/5=10), a latency capability of the vendor A VNF configured to perform the firewall function (e.g., Lat.=$c_{fw}$/2=5/2=2), and a cost of the vendor A VNF configured to perform the firewall function (e.g., Cost=12). Here, one instance of the vendor A VNF configured to perform the NAT function is not sufficient since the bandwidth capability of the VNF (e.g., 10) does not meet or exceed the bandwidth parameter for the first traffic flow plus the bandwidth parameter of the second traffic flow (e.g., 5+10=15). As such, design platform 215 may add another instance of the vendor A VNF in order to provide sufficient bandwidth, and may update the bandwidth capability (e.g., BW=2×10=20) and the cost (e.g., Cost=2× 12=24), accordingly. As shown, a network service design generated as a result of steps 2 through 4 may have a total cost of 50 (e.g., $Cost_{total}$ 14+12+24=50). Design platform 215 may store the network service design as a best network service design (e.g., a network service design that satisfies the performance parameters with a lowest cost) to be compared to other network service designs, as described below.

After step 4, design platform 215 may generate a second network service design by differently assigning vendor VNFs to the load balance groups. For example, design platform 215 may backtrack one step and may evaluate whether a vendor B VNF configured to perform the firewall function will result in a new best network service design. Here, design platform 215 may determine that a vendor B VNF configured to perform the firewall function will not result in a new best network service design since the vendor B firewall VNF will not satisfy the latency parameter for the first traffic flow or the second traffic flow (e.g., since the latency capability of the vendor B firewall VNF is less than the latency parameters for both the first traffic flow and the second traffic flow).

Similarly, design platform 215 may backtrack another step and may evaluate whether a vendor B VNF configured to perform the NAT function will result in a new best network service design. Here, design platform 215 may determine that a vendor B VNF configured to perform the NAT function will not result in a new best network service design since three instances of the vendor B NAT VNF would be needed to satisfy the bandwidth parameter for the first traffic flow and the second flow (e.g., BW=5×3=15=5+ 10). Three instances of the vendor B NAT VNF will result in a cost of 36 (e.g., Cost=12×3=36). As such, a cost after assigning the vendor A URL filtering VNF and the vendor B NAT VNF (e.g., without a VNF to perform the firewall function) equals a total cost of the first network service design (e.g., 14+36=50), allowing design platform 215 to determine that such a network service design will not be a new best network service design.

As such, design platform 215 may backtrack to assignment of a VNF to the URL filtering function. As shown at step 5, design platform 215 may assign a vendor B VNF to perform the URL filtering function for the first traffic flow. As shown, design platform 215 may determine, based on the attribute information and the design parameters, a bandwidth capability of the vendor B VNF configured to perform the URL filtering function (e.g., BW=5), a latency capability of the vendor B VNF configured to perform the URL filtering function (e.g., Lat.=3), and a cost of the vendor B VNF configured to perform the URL filtering function (e.g., Cost=10+$c_{url}$=10+3=13). Here, one instance of the vendor B VNF configured to perform the URL filtering function is sufficient since the bandwidth capability of the VNF (e.g., 5) meets or exceeds the bandwidth parameter for the first traffic flow of (e.g., 5)

As shown at step 6, design platform 215 may assign the vendor A VNF to perform the NAT function for the first traffic flow and the second traffic flow (e.g., in a manner similar to that described above with regard to step 3). As shown at step 7, design platform 215 may assign the vendor A VNF to perform the firewall function for the first traffic flow and the second traffic flow (e.g., in a manner similar to that described above with regard to step 4).

As shown, a network service design generated at step 7 may have a total cost of 49 (e.g., $Cost_{total}$=13+12+24=49). Design platform 215 may compare the network service design to the best network service design (e.g., generated at step 4) and may determine that the newly generated network service design is the best network service design (e.g., since the cost of the newly generated network service design is less than the cost of the previous best network service design). Design platform 215 may perform additional iterations associated with the selected set of load balance groups and, at a later time (e.g., when all possible combinations of VNF assignments for the select set of load balance groups have been searched), design platform 215 may select another set of load balance groups and continue this process.

Figure 7D:
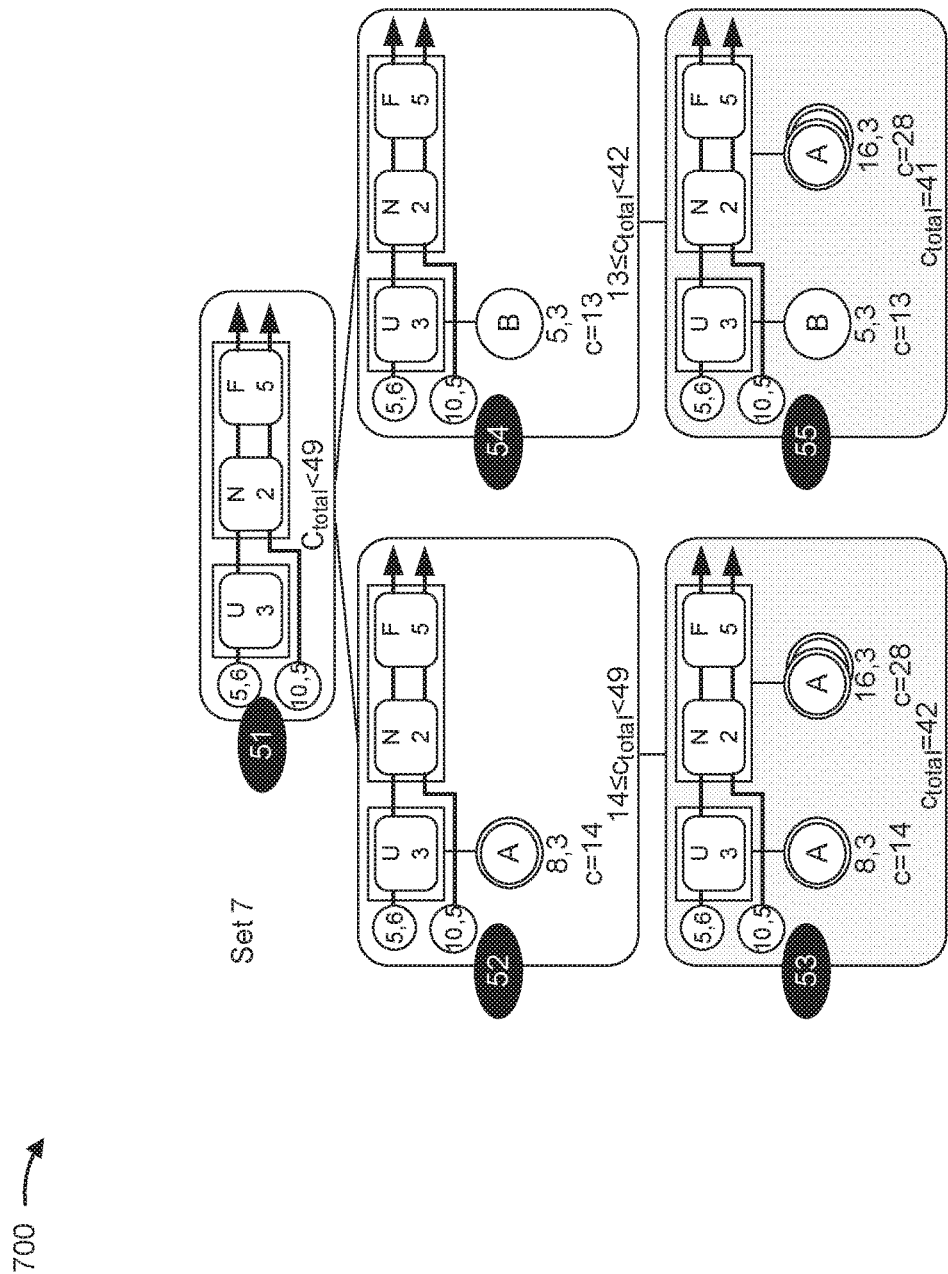

For the purposes of FIG. 7D, assume that design platform 215 has performed additional iterations associated with six set of load balance groups in the manner described above (e.g., for a total of 50 steps) without generating a new best network service design (i.e., all network service designs generated between steps 8 and 50 had a higher cost than the network service design generated at step 4 of FIG. 7C).

As shown in FIG. 7D, at step 51, design platform 215 may select the seventh set of load balance groups as the set of load balance groups based on which design platform 215 will generate a next set of network service designs. As shown, the seventh set of load balance groups may include a first load balance group associated with the URL filtering function for the first traffic flow, and a second load balance group associated with the NAT function and the firewall function for the first traffic flow and the second traffic flow.

As further shown, at step 52, design platform 215 may assign the vendor A VNF to perform the URL filtering function for the first traffic flow (e.g., in a manner similar to that described above with regard to step 2).

As shown at step 53, design platform 215 may assign a vendor A VNF to perform the NAT function and the firewall function for the first traffic flow and the second traffic flow. As shown, design platform 215 may determine, based on the attribute information and the design parameters, a bandwidth capability of the vendor A VNF configured to perform the NAT and firewall functions (e.g., BW=60/($c_{nat}$+$c_{fw}$)=60/(2+5)=8), a latency capability of the vendor A VNF configured to perform the NAT and firewall functions (e.g., Lat.=($c_{nat}$+$c_{fw}$)/2=(2+5)/2=3), and a cost of the vendor A VNF configured to perform the NAT and firewall functions (e.g., Cost=14). Here, one instance of the vendor A VNF configured to perform the NAT and firewall functions is not sufficient since the bandwidth capability of the VNF (e.g., 8) does not meet or exceed the bandwidth parameter for the first traffic flow plus the bandwidth parameter of the second traffic flow (e.g., 5+10=15). As such, design platform 215 may add another instance of the vendor A VNF in order to provide sufficient bandwidth, and may update the bandwidth capability (e.g., BW=2×8=16) and the cost (e.g., Cost=2× 14=28), accordingly. As shown, a network service design generated at step 53 may have a total cost of 42 (e.g., $Cost_{total}$=14+28=42). Design platform 215 may compare the network service design to the best network service design (e.g., generated at step 7) and may determine that the newly generated network service design is the best network service design.

Next, design platform 215 may backtrack to assignment of a VNF to the URL filtering function (e.g., for reasons similar to those described above with regard to step 4). As further shown, at step 54, design platform 215 may assign the vendor B VNF to perform the URL filtering function for the first traffic flow (e.g., in a manner similar to that described above with regard to step 5).

As shown at step 55, design platform 215 may assign a vendor A VNF to perform the NAT function and the firewall function for the first traffic flow and the second traffic flow (e.g., in a manner similar to that described above with regard to step 53). As shown, a network service design generated as a result of step 55 may have a total cost of 41 (e.g., $Cost_{total}$=13+28=41). Design platform 215 may compare the network service design to the best network service design (e.g., generated at step 54) and may determine that the newly generated network service design is the best network service design.

Figure 7E:
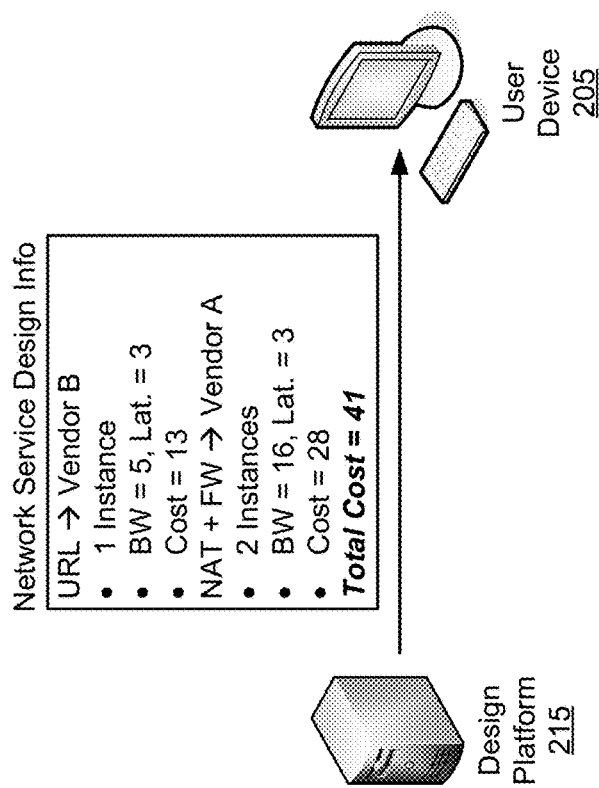

For the purposes of FIG. 7E, assume that design platform 215 finishes searching for the best network service design (e.g., that design platform 215 generates and/or evaluates all possible network service designs), and that the network service design generated at step 55 is the best network service design (i.e., lowest cost network service design that satisfies the performance parameters). As shown in FIG. 7E, design platform 215 may provide information associated with the network service design to user device 205 (e.g., such that the user may review and/or approve the information associated with the network service design).

As indicated above, FIGS. 7A-7E are provided merely as an example. Other examples are possible and may differ from what was described with regard to FIGS. 7A-7E.

Implementations described herein provide a design platform capable of receiving information associated with requirements for a network service and generating a network service design based on analyzing the requirements and information associated with a set of VNFs configured to perform network functions associated with the network service.

The foregoing disclosure provides illustration and description, but is not intended to be exhaustive or to limit the implementations to the precise form disclosed. Modifications and variations are possible in light of the above disclosure or may be acquired from practice of the implementations. For example, in some implementations, design platform 215 may include a load balancer in the network service design (e.g., in order to increase bandwidth or provide reliability). In such a case, design platform 215 may consider a cost and/or a performance of the load balancer when generating the network service design.

As another example, design platform 215 may generate the network service design such that VNFs associated with different vendors may be mixed and/or may be differently configured within a load balance group (e.g., rather than all VNFs, assigned to a particular load balance group, being associated with a same vendor).

As yet another example, design platform 215 may generate the network service design such that not all traffic, associated with a traffic flow received by a VNF, flows through all network functions configured on the VNF. In this example, the VNF would be configurable to send subsets of the traffic flow through different sequences of network functions.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors; and
   one or more memories to:
   receive a set of design parameters for a network service,
   the set of design parameters including information that identifies one or more network functions associated with the network service;
   determine one or more complexity parameters corresponding to the one or more network functions,
   the one or more complexity parameters including information identifying a measure of complexity associated with a corresponding network function of the one or more network functions,
   each of the one or more complexity parameters being expressed as a numerical value on a complexity scale, and
   each of the one or more network functions having a corresponding complexity scale;
   determine attribute information associated with a plurality of virtual network functions (VNFs),
   the attribute information specifying:
   at least one network function, of the one or more network functions, capable of being performed by a corresponding VNF of the plurality of VNFs, and
   a cost associated with the corresponding VNF;
   determine cost information, associated with a cost of configuring the corresponding VNF to perform the at least one network function, based on a complexity parameter of the one or more complexity parameters, the complexity parameter corresponding to the at least one network function;
   generate, automatically based on receiving the set of design parameters and by implementing a combinatorial optimization technique, a network service design, associated with providing the network service, based on the one or more network functions, the one or more complexity parameters, the cost information, and the attribute information,
   the network service design including information identifying one or more VNFs, of the plurality of VNFs, that are capable of providing the network service in accordance with the set of design parameters;
   provide data to cause deployment of the network service based on the network service design;
   provide, after providing data to cause deployment of the network service, data that causes one or more test traffic flows to be provided to the network service;
   monitor one or more performance metrics associated with the one or more test traffic flows; and
   verify, based on monitoring the one or more performance metrics, whether the network service design satisfies the set of design parameters.

2. The device of claim 1, where the set of design parameters includes a cost parameter that identifies a maximum cost associated with the network service design, and
   where the one or more processors, when generating the network service design, are to:
   generate the network service design based on the cost parameter.

3. The device of claim 1, where the cost associated with the corresponding VNF is associated with the cost of configuring the corresponding VNF to perform the at least one network function, and
   where the one or more processors, when generating the network service design, are to:
   generate the network service design based on the cost of configuring the corresponding VNF to perform the at least one network function.

4. The device of claim 1, where the network service design is a first network service design,
   where the one or more processors are further to:
   generate a second network service design based on the one or more network functions, the one or more complexity parameters, and the attribute information,
   the second network service design being different from the first network service design;

compare the first network service design and the second network service design; and where the one or more processors, when providing the data to cause deployment of the network service based on the network service design, are to:

selectively provide information associated with the first network service design or information associated with the second network service design based on comparing the first network service design and the second network service design.

5. The device of claim 1, where the one or more VNFs include at least two VNFs, and where a first VNF, of the at least two VNFs, is supported by a first vendor, and a second VNF, of the at least two VNFs, is supported by a second vendor, the second vendor being different from the first vendor.

6. A non-transitory computer-readable medium storing instructions, the instructions comprising:

one or more instructions that, when executed by one or more processors, cause the one or more processors to:

receive a set of design parameters, associated with a network service, that identifies a set of network functions associated with the network service;

determine a set of complexity parameters corresponding to the set of network functions, the set of complexity parameters including information identifying a measure of complexity associated with a corresponding network function of the set of network functions, each complexity parameter, of the set of complexity parameters, being expressed as a numerical value on a complexity scale, and each network function, of the set of network functions, having a corresponding complexity scale;

receive attribute information associated with a plurality of virtual network functions (VNFs), the attribute information specifying:

at least one network function, of the set of network functions, capable of being performed by a corresponding VNF of the plurality of VNFs, and a cost associated with the corresponding VNF;

determine cost information, associated with a cost of configuring the corresponding VNF to perform the at least one network function, based on a complexity parameter of the set of complexity parameters, the complexity parameter corresponding to the at least one network function;

generate, automatically based on receiving the set of design parameters and by implementing a combinatorial optimization technique, a network service design, associated with providing the network service, based on the set of network functions, the set of complexity parameters, the cost information, and the attribute information, the network service design identifying one or more VNFs, of the plurality of VNFs, capable of being configured to provide the network service in accordance with the set of design parameters;

provide data to cause deployment of the network service based on the network service design;

provide, after providing data to cause deployment of the network service, data that causes one or more test traffic flows to be provided to the network service;

monitor one or more performance metrics associated with the one or more test traffic flows; and verify, based on monitoring the one or more performance metrics, whether the network service design satisfies the set of design parameters.

7. The non-transitory computer-readable medium of claim 6, where the set of design parameters includes a performance parameter that identifies a minimum capability for the network service design, and where the one or more instructions, that cause the one or more processors to generate the network service design, further cause the one or more processors to:

generate the network service design based on the performance parameter.

8. The non-transitory computer-readable medium of claim 6, where the attribute information includes capability information associated with a capability of the corresponding VNF when performing the at least one network function, and where the one or more instructions, that cause the one or more processors to generate the network service design, further cause the one or more processors to:

generate the network service design based on the capability information.

9. The non-transitory computer-readable medium of claim 6, where the network service design is a first network service design, where the one or more instructions, when executed by the one or more processors, further cause the one or more processors to:

generate a second network service design based on the set of network functions, the set of complexity parameters, and the attribute information, the second network service design being different from the first network service design;

compare the first network service design and the second network service design; and where the one or more instructions, that cause the one or more processors to provide the data to cause the deployment of the network service based on the network service design, cause the one or more processors to:

selectively provide information associated with the first network service design or information associated with the second network service design based on comparing the first network service design and the second network service design.

10. The non-transitory computer-readable medium of claim 6, where the one or more instructions, when executed by the one or more processors, further cause the one or more processors to:

determine capability information, associated with a capability of the corresponding VNF when performing the at least one network function, based on the complexity parameter; and where the one or more instructions, that cause the one or more processors to generate the network service design, further cause the one or more processors to:

generate the network service design based on the capability information.

11. The non-transitory computer-readable medium of claim 6, where the one or more VNFs include at least two VNFs, and where a first VNF, of the at least two VNFs, is supported by a first vendor, and a second VNF, of the at least two VNFs, is supported by a second vendor, the second vendor being different from the first vendor.

12. A method, comprising:
- receiving, by a device, a set of design parameters, associated with a network service, that identifies a set of network functions associated with the network service;
- determining, by the device, a set of complexity parameters corresponding to the set of network functions,
  - the set of complexity parameters including information identifying a measure of complexity associated with a corresponding network function included in the set of network functions,
  - each complexity parameter, of the set of complexity parameters, being expressed as a numerical value on a complexity scale, and
  - each network function, of the set of network functions, having a corresponding complexity scale;
- determining, by the device, attribute information associated with a plurality of virtual network functions (VNFs),
  - the attribute information specifying:
    - at least one network function, of the set of network functions, capable of being performed by a corresponding VNF of the plurality of VNFs, and
    - a cost associated with the corresponding VNF;
- determining, by the device, cost information, associated with a cost of configuring the corresponding VNF to perform the at least one network function, based on a complexity parameter of the set of complexity parameters,
  - the complexity parameter corresponding to the at least one network function;
- generating, by the device and automatically based on receiving the set of design parameters and by implementing a combinatorial optimization technique, a network service design, associated with providing the network service, based on the set of network functions, the set of complexity parameters, the cost information, and the attribute information,
  - the network service design identifying one or more VNFs, of the plurality of VNFs, capable of being configured to provide the network service in accordance with the set of design parameters;
- providing, by the device, data to cause deployment of the network service based on the network service design;
- providing, by the device and after providing data to cause deployment of the network service, data that causes one or more test traffic flows to be provided to the network service;
- monitoring, by the device, one or more performance metrics associated with the one or more test traffic flows; and
- verifying, by the device and based on monitoring the one or more performance metrics, whether the network service design satisfies the set of design parameters.

13. The method of claim 12, where the set of design parameters includes at least one of:
- a cost parameter that identifies a maximum cost associated with the network service design; or
- a performance parameter that identifies a minimum capability associated with the network service design; and where generating the network service design comprises:
- generating the network service design based on the cost parameter or the performance parameter.

14. The method of claim 12, where the attribute information includes
- capability information associated with a capability of the corresponding VNF when performing the at least one network function; and
- where generating the network service design comprises:
  - generating the network service design based on the the capability information.

15. The method of claim 12, where the one or more VNFs include at least two VNFs, and
- where a first VNF, of the at least two VNFs, is supported by a first vendor, and a second VNF, of the at least two VNFs, is supported by a second vendor,
  - the second vendor being different from the first vendor.

16. The device of claim 1, where the one or more processors, when generating the network service design, are to:
- implement:
  - a local search technique, or
  - a branch and bound technique.

17. The non-transitory computer-readable medium of claim 6, where the one or more instructions, when generating the network service design, cause the one or more processors to:
- implement:
  - a branch and bound technique with constraint propagation, or
  - a mixed integer linear programming technique.

18. The device of claim 1, where the one or more processors are further to:
- obtain access to an instance of a first VNF performing a first network function of the one or more network functions;
- provide data that causes a traffic flow to be provided to the instance;
- monitor one or more metrics associated with the instance; and
- determine the attribute information based on monitoring the one or more metrics.

19. The method of claim 12, wherein determining the attribute information comprises:
- obtaining access to an instance of a first VNF performing a first network function of the set of network functions;
- causing traffic flow to be provided to the instance;
- monitoring one or more metrics associated with the instance; and
- determining the attribute information based on monitoring the one or more metrics.

20. The method of claim 12, wherein generating the network service design comprises:
- generating the network service design by implementing at least one of:
  - a local search technique,
  - a brand and bound technique,
  - a branch and bound technique with constraint propagation, or
  - a mixed integer linear programming technique.

* * * * *